Patented Jan. 18, 1938

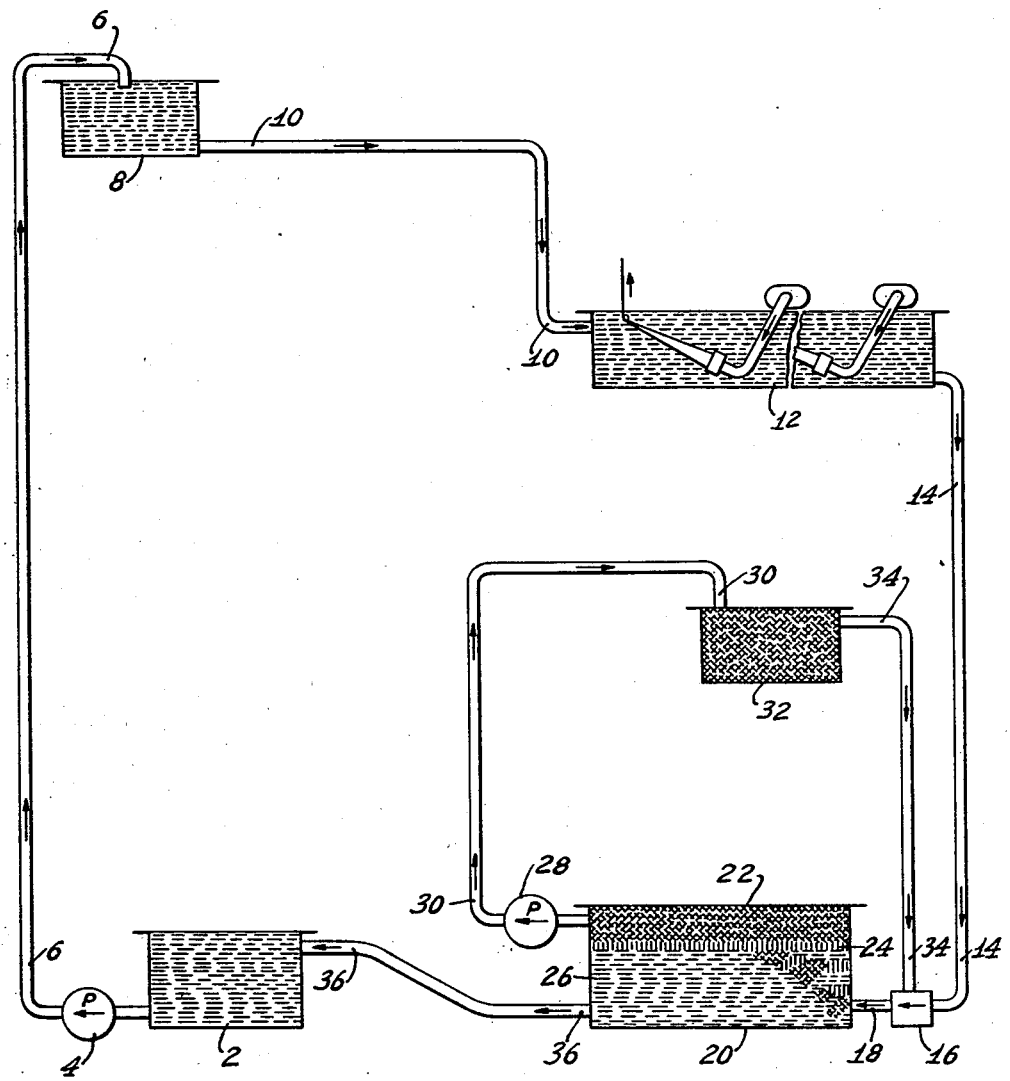

2,105,684

UNITED STATES PATENT OFFICE 2,105,684

TREATMENT OF ACID SETTING BATHS USED IN THE MANUFACTURE OF CELLULOSE PRODUCTS FROM VISCOSE

Joseph L. Costa, Woonsocket, R. I., assignor to Manville Jenckes Corporation, Manville, R. I., a corporation of Delaware Application March 13, 1937, Serial No. 130,796

9 Claims. (Cl. 18—54)

The present invention relates to the treatment of acid setting baths utilized in the manufacture of cellulose products from viscose, and is more especially concerned with the purification of the acid setting solution employed in the manufacture of artificial silk in accordance with the viscose wet spinning process.

In the manufacture of cellulose products from viscose, it is the usual practice to introduce the viscose solution into an acid setting bath which operates to break down the viscose solution and to precipitate the cellulose out in the form of filaments, threads, ribbon, sheets or tubing, etc. This operation is most efficiently performed in the form of a continuous process in which an uninterrupted flow of viscose to the setting bath is maintained over long periods of time. During continued operation, impurities produced by the decomposition of the viscose, gradually accumulate in the setting bath until it becomes necessary to renew or purify the bath in order to avoid undesirable coloration and contamination of the product. It is the usual practice to draw off the setting bath and to remove such impurities by filtration or settling, the solution then being returned to active use.

These methods of purification have been found to have certain disadvantages in that the solution is not wholly purified because of the highly colloidal character of the impurities contained therein, which makes it impossible to wholly remove such impurities either by filtration or settling. Furthermore, these methods are costly in that large storage facilities must be maintained for the replenishing of the setting solution, and more particularly where filters are used, the installation and maintenance of the equipment required, is a considerable item of expense.

In accordance with the present invention, it is proposed to purify the contaminated acid setting solution by the relatively simple and inexpensive process of mixing with the setting solution an oily liquid substantially not soluble in the setting solution for which sulphur and the other colloidal decomposition products produced in the decomposition of viscose have a preferential affinity, and thereafter separating the oily liquid together with the impurities attracted thereby from the setting solution, which is then returned to active use. The preferred method may be carried out with an oily liquid which is lighter than the setting solution, so that the impurities are carried to the surface of the setting solution to be removed with the oily liquid as by flotation, or may be carried out with an oily liquid which is heavier than the setting solution, so that the impurities are carried to the bottom of the solution and separated therefrom.

The several features of applicant's invention hereinafter described and claimed, together with the advantages to be obtained thereby, will be readily understood by one skilled in the art from the following description taken in connection with the accompanying drawing in which the figure is a schematic showing of the circulating system for the setting solution to and from the spin bath.

In the preferred form of applicant's invention, the setting solution is drawn off from the bath through a circulating system in which the oily liquid is thoroughly mixed with the setting solution to cause the liquid to come into intimate contact with all of the impurities existing in the solution. The mixing operation may be performed in any one of a number of ways, as by spraying the liquid into the solution, or by stirring, or by bubbling air through the solution. By virtue of the mixing process carried out as above described, the impurities existing in the solution which are ordinarily hydrophytic in character, are wet by the oily liquid, and then become hydrophobic, and are easily separated out of the setting solution with the immiscible oily liquid.

Applicant has found by experimentation that pine oil forms a particularly satisfactory medium for the removal of sulphur and other colloidal impurities from the setting solution in accordance with the method above described. The setting solution is drawn off from the bath through a circulating system in which pine oil is thoroughly mixed with the setting solution. Pine oil has been found to exhibit a relatively great affinity for particles of sulphur and other colloidal decomposition products existing in the setting solution, acting to wet these particles so that they become hydrophobic in character. In a very short period of time the pine oil will rise to the surface and separate from the setting solution, carrying with it all of these particles. These particles being heavier than the pine oil, go to the bottom of the oil and form a separate layer above the setting solution. The pine oil and the decomposition products held thereby are then drawn off from the solution which passes through the circulating system back into the setting bath. Pine oil has been found to be of particular value in that it does not attack the setting solution, and even where traces of the pine oil are permitted to return into the setting solution, has no propensity to attack the cellulose.

A preferred form of circulating system illustrating applicant's process for continuously circulating and purifying the setting solution is shown schematically in the drawing, in which the setting solution is drawn from a main reservoir 2 by means of a pump 4 through line 6 to an elevated storage tank 8 from which it passes through line 10 to the usual spin bath 12. A continuous circulation of the setting solution is maintained in the spin bath, the solution as it becomes contaminated by continued use, being drawn off through a pipe line 14 to a mixing device 16 at which point pine oil is thoroughly mixed with the setting solution. The mixture then passes through connection 18 to a separating tank 20 in which the pine oil separates out, carrying with it such sulphur and other colloidal impurities as may be present in the solution. The relatively light pine oil rises to the surface, forming a separate layer 22. The impurities referred to, being heavier, tend to form a third layer 24 at the bottom of the pine oil and above the setting solution 26. The pine oil constituting the top layer 22 is drawn off from the separating tank 20 by a pump 28 through pipe line 30 to a storage tank 32 from which it is returned through line 34 to the mixing device 16. The purified setting solution forming the bottom layer 26 in the separating tank 20 is drawn off through pipe connection 36 to the main reservoir 2, thus completing the circulating cycle. The impurities collected in the separating tank 20 and forming the layer 24 as above described, may be readily removed from time to time by scooping or raking without in any way interfering with the continuity or efficiency of the process.

It will readily be seen with the process as above described, that a comparatively rapid and continuous circulation of the setting solution from and to the setting bath may be readily obtained, in which a relatively small excess amount of setting solution is required to maintain the bath at all times in operation. As compared with the usual method of purifying the setting solution by the use of filters which tend rapidly to become clogged and require frequent cleaning, applicant's process may be kept in operation without interruption over long periods of time with a minimum amount of care on the part of the operator. This method of purifying the setting solution has the further advantage that even the finest particles of sulphur and other impurities are drawn off from the solution, producing a degree of purification which has not heretofore been achieved by any of the methods in the art. It has been found in the practice of the method as above described, that no adjustment of the composition of the setting solution is required subsequent to purification. Furthermore, the pine oil is readily recovered for repeated use as above described, the impurities held thereby being readily removed by skimming or other well known methods, thus enabling the process to be practiced at a negligible cost.

It will be understood that while the applicant in the preferred form of the invention shown, utilizes pine oil for the separating medium, it is contemplated that other oily liquids may be employed having the characteristics above described, being substantially not soluble in the setting solution, and exhibiting a relatively great affinity for particles of sulphur and other colloidal decomposition products produced in the decomposition of viscose. The invention in its broader aspects is not limited to any specific method of separation of the oily liquid and the setting solution, it being understood that this separation may be accomplished by any well known process of flotation, skimming or drawing off one liquid from the other.

The invention having been described, what is claimed is:—

1. A process of purifying the contaminated acid setting solution resulting from the decomposition of viscose to form cellulose products such as thread, ribbon, sheets or tubing, which comprises mixing with the setting solution an oily liquid substantially not soluble in the setting solution for which sulphur and other colloidal decomposition products produced in the decomposition of viscose have a preferential affinity, and thereafter separating the oily liquid from the setting solution.

2. That step in the process of purifying the contaminated acid setting solution resulting from the decomposition of viscose to form cellulose products such as thread, ribbon, sheets or tubing, which comprises thoroughly mixing pine oil with the setting solution to bring the pine oil into intimate contact with all of the sulphur and other decomposition products in the solution.

3. A process of purifying the contaminated acid setting solution resulting from the decomposition of viscose to form cellulose products such as thread, ribbon, sheets or tubing, which comprises mixing pine oil with the setting solution to intimately contact the pine oil with particles of sulphur and other decomposition products in the solution, and thereafter removing the pine oil and sulphur and other colloidal decomposition products produced in the decomposition of viscose from the setting solution.

4. A process of purifying the contaminated acid setting solution resulting from the decomposition of viscose to form cellulose products such as thread, ribbon, sheets or tubing, which comprises mixing with the setting solution an oily liquid substantially not soluble in the setting solution for which sulphur and other colloidal decomposition products produced in the decomposition of viscose have a preferential affinity, and thereafter separating the oily liquid from the setting solution by flotation.

5. A process of purifying the contaminated acid setting solution resulting from the decomposition of viscose to form cellulose products such as thread, ribbon, sheets or tubing, which comprises mixing pine oil with the setting solution to intimately contact the pine oil with particles of sulphur and other decomposition products in the solution, and thereafter removing the pine oil and sulphur and other colloidal decomposition products produced in the decomposition of viscose from the setting solution by flotation.

6. A process of purifying the contaminated acid setting solution resulting from the decomposition of viscose to form cellulose products such as thread, ribbon, sheets or tubing, which comprises drawing off the setting solution through a circulating system, mixing with the setting solution an oily liquid substantially not soluble in the setting solution for which sulphur and other colloidal decomposition products produced in the decomposition of viscose have a preferential affinity, separating the oily liquid from the setting solution, and thereafter returning the setting solution to active use.

7. A process of purifying the contaminated acid setting solution resulting from the decomposition of viscose to form cellulose products such as thread, ribbon, sheets or tubing, which comprises circulating the setting solution continuously through a circulating system including a setting bath, introducing into said circulating system and mixing with said setting solution an oily liquid substantially not soluble in the setting solution for which sulphur and other colloidal decomposition products produced in the decomposition of viscose have a preferential affinity, separately drawing off said solution and oily liquid, and returning said solution to the setting bath.

8. A process of purifying the contaminated acid setting solution resulting from the decomposition of viscose to form cellulose products such as thread, ribbon, sheets or tubing, which comprises circulating the setting solution continuously through a circulating system from and to a setting bath, mixing pine oil with the circulating setting solution, drawing off said solution and pine oil through separate conduits, returning said setting solution to the setting bath, and again mixing the pine oil with the setting solution in circulation.

9. A process of purifying the contaminated acid setting solution resulting from the decomposition of viscose to form cellulose products such as thread, ribbon, sheets or tubing, which comprises circulating the setting solution continuously through a circulating system from and to a setting bath, mixing pine oil with the circulating setting solution and allowing said setting solution and pine oil to separate into separate levels, drawing off said setting solution and pine oil through separate conduits, removing the intermediate layer of impurities, returning said setting solution to the setting bath, and again mixing the pine oil with the setting solution in circulation.

JOSEPH L. COSTA.